United States Patent [19]

Torres et al.

[11] Patent Number: 4,531,214

[45] Date of Patent: Jul. 23, 1985

[54] POWER LOSS ANALYZER CIRCUIT

[75] Inventors: John R. Torres, Somers; Rocco V. Albano, Granby, both of Conn.

[73] Assignee: United Technologies Corporation, Hartford, Conn.

[21] Appl. No.: 497,771

[22] Filed: May 24, 1983

[51] Int. Cl.³ .................. G11C 29/00; G06F 11/00
[52] U.S. Cl. ........................................ 371/66; 365/228
[58] Field of Search ............... 371/66, 62; 365/226, 365/228, 229; 324/78 Z; 364/200, 900

[56] References Cited

U.S. PATENT DOCUMENTS

| | | | |
|---|---|---|---|
| 3,321,747 | 5/1967 | Adamson | 371/66 X |
| 3,890,494 | 6/1975 | Meshek et al. | 371/66 |
| 3,937,937 | 2/1976 | McVey | 371/66 |
| 4,122,359 | 10/1978 | Breikss | 365/229 X |
| 4,323,987 | 4/1982 | Holtz et al. | 365/229 |
| 4,410,991 | 10/1983 | Lenart | 371/66 |
| 4,433,390 | 2/1984 | Carp et al. | 364/900 |
| 4,458,307 | 7/1984 | McAnlis et al. | 364/200 |

Primary Examiner—Charles E. Atkinson
Attorney, Agent, or Firm—Francis J. Maguire, Jr.

[57] ABSTRACT

A power loss analyzer for providing a signal processor with a discrete power loss alert signal indicative of an imminent power disruption and for providing to the processor subsequent to a disruption a discrete power loss signal indicative of a power disruption that has resulted in degradation of the data stored in memory is disclosed.

9 Claims, 4 Drawing Figures

POWER LOSS ANALYZER CIRCUIT

DESCRIPTION

1. Technical Field

This invention relates to power loss analyzer circuits, and more particularly to power loss analyzer circuits for electronic signal processors.

2. Background Art

As known in the art, power loss analyzer circuits are used in conjunction with power-on-reset (POR) circuits to provide a signal processor with timely information concerning power interruptions. The POR circuit monitors the DC voltage supplied to the processor and provides an interrupt signal to the processor if the DC voltage decays below a selected value. The processor interrupts processing after receipt of a POR signal. A power loss analyzer circuit may include a discrete power loss alert (DPLA) circuit and a discrete power loss (DPL) circuit which both monitor the AC source or a conditioned signal derived therefrom. The DPLA circuit provides an alert signal indicative of an imminent power interruption to the signal processor sufficiently in advance of the POR interrupt signal for the signal processor to properly prepare for an imminent interruption of processing (by the POR interrupt signal). Upon restoration of power, the DPL circuit provides the signal processor with information concerning the duration of the interruption. The signal processor utilizes the DPL signal information in determining the proper initialization routine on start-up.

The POR interrupt signal causes the central processing unit (CPU) of the signal processor to enter into a reset mode in which all processing is stopped and no further data updates are accepted. The actuation of the reset mode by the POR interrupt signal also causes certain registers, memory locations, and other hardware to be initialized in a predefined manner so that upon restoration of power a predetermined start-up sequence may be executed.

Since there are certain CPU operations that cannot be interrupted without adverse effects, the DPLA signal is timed to occur slightly before a POR interrupt signal so that such operations are not initiated by the CPU subsequent to the reception of a DPLA signal. The DPLA signal is timed to precede the POR interrupt signal by a sufficient interval to allow all such operations initiated before the occurence of a DPLA signal to be fully executed before the signal processor is interrupted.

The prior art DPLA circuits provided the DPLA signal by monitoring the AC input line or a conditioned version thereof for voltage decay through a selected threshold value circuit. Typically the circuit is a passive filter using a resistive-capacitor combination, e.g., an RC timing circuit. The high capacitor values require the use of tantalum capacitors which are higher tolerance style capacitors. As a result it is difficult to provide a tight tolerance RC time constant and, therefore, to provide a reliable DPLA lead time interval to the POR interrupt signal. In some instances, with worst case tolerance conditions the two signals may overlap, completely nullifying any utility provided by the DPLA to the processor.

Additionally, the prior art method of simply monitoring the AC input voltage for decay below a selected value sometimes provides an inaccurate indication of an imminent loss of power to the processor because a temporary voltage decay may not cause sufficient degradation of the regulated power supply output voltage to cause a logic supply bus failure. The initiation of a DPLA signal at a fixed time interval following such decay relies on the inference that the harmful effects of an actual power interruption will usually occur at that particular fixed time after AC input voltage decays below that particular selected voltage value. Since an actual power interruption is defined by a power-on-reset (POR) circuit to be a decay of the DC logic supply bus below a selected value, and the logic bus will decay at different rates depending on innumerable factors, it is evident that the prior art timing circuit must be designed for the worst case and as a result, many DPLA signals are needlessly generated. This results in unnecessary interruptions of the CPU and inefficiencies are introduced into the operation of the signal processor. For example, if the load on the DC logic supply bus is relatively light at the time of a transient on the AC line, the logic bus voltage may be maintained for a longer period than it otherwise would under worst case loading conditions. In the case where the disturbance quickly disappears, the DPLA signal unnecessarily interrupts the processor thereby decreasing efficiency.

As is further known in the art, a power loss analyzer circuit may include a discrete power loss (DPL) circuit that also monitors the AC source voltage or a conditioned version thereof. The DPL circuit determines the time interval from the beginning of a power interruption (as defined by a decay in the AC input voltage below a selected value) and the restoration of that voltage. The purpose of the DPL signal is to provide the signal processor with an indication that the integrity of the contents of volatile memory has been degraded. A signal indicative of the duration of the power interruption is provided only if the interruption lasts longer than a selected interval. The interval is selected based on a worst case calculation of the length of time built-in passive energy storage elements (capacitors) can sustain the regulated DC bus during a power interruption. Since the contents of the volatile memory may be preserved for that interval, a less elaborate initialization routine is then needed if power is restored before those contents are lost. Thus, the signal processor utilizes a DPL signal after a long-term interruption to initiate a more elaborate initialization routine than it otherwise would have after a shorter term interruption.

The prior art uses passive RC timing circuits to provide the DPL signal to the processor if the power loss interval was longer than that set by the RC time constant of the DPL timing circuit. As discussed above in connection with the DPLA circuit, the selected RC time constant value is chosen based on worst case loading conditions of the energy storage elements. The overwhelming majority of power disruptions do not lead to loss of DC regulation, but the choice of a worst case RC threshold time constant often results in an unnecessary DPL signal, and an inefficient reloading of memory. Although this results in unnecessary memory reload it is a conservative approach which ensures the integrity of the processed data. It does, however, contribute significantly to the cumulative down time of the processor and is, therefore, undesirable.

Disclosure of Invention

The object of the present invention is to provide improved power loss analyzer circuitry which minimizes signal processor down time.

According to a first aspect of the present invention, a power loss analyzer circuit for a signal processor having a pulse width modulated (PWM) regulator with a duty cycle modulated output, provides a discrete power loss alert (DPLA) signal to the processor in response to a PWM duty cycle value indicative of an imminent loss of regulated DC voltage, by sensing the present value of the duty cycle of the PWM regulator's unfiltered output waveform, providing a sensed signal indicative thereof, and comparing that sensed signal to a reference signal value representative of a specified maximum duty cycle whenever the sensed signal value is less than the reference signal value.

In further accord with this first aspect of the present invention, the duty cycle of the output waveform of the PWM power supply is monitored by a duty cycle detector that includes an integrator network responsive to a threshold network. The integrator network includes a passive energy storage element such as a capacitor which charges and discharges according to whether or not a discharge path through a switch controlled by the threshold network is open or closed. The threshold network is responsive to the duty cycle of the output waveform of the PWM power supply and thus causes the state of charge of the capacitor in the integrator network to vary directly according to variations in the present value of the duty cycle.

During a power disruption, the amplitude of the unfiltered output waveform of the PWM power supply may steadily decrease while, at the same time, the duty cycle steadily increases. If the duty cycle increases to a percentage greater than a selected maximum value then an actual power loss is very likely. By monitoring the duty cycle of the output waveform and selecting a maximum allowed duty cycle before generating a DPLA signal, a high degree of reliability in the prediction of power losses can be achieved. By avoiding the drawing of inferences concerning the status of the regulated power supply from the behavior of the AC input voltage, many of the factors such as line, load, temperature, and most component degradation effects that influence the performance of the prior art circuitry are obviated.

According to a second aspect of the present invention, a power loss analyzer circuit for a signal processor provides a discrete power loss (DPL) signal to the processor in response to a disruption of the regulated DC voltage which energizes the processor's memory, for identifying to the processor a regulated DC voltage decay to a value insufficient to maintain the integrity of the processor's memory content, by sensing the present value of the regulated DC voltage supply to the memory and by sampling that sensed voltage during the interval of a disruption for replicating the lowest voltage value reached during such interval, and by comparing the lowest voltage value reached to a reference value below which the integrity of the contents of memory may not be maintained.

In further accord with this second aspect of the present invention, the regulated DC voltage supply to the memory is sensed by a monitor circuit connected to the regulated DC bus in such a way as to sense the voltage of the regulated DC bus under normal operating conditions, and to sense and retain the lowest voltage value reached during a power disruption.

In still further accord with this second aspect of the present invention, the monitor circuit may have a sensing capacitor connected to the volatile memory's regulated DC bus through a pair of switches connected in such a way as to disconnect the sensing capacitor from its direct connection to the memory's bus upon the decay of the voltage level of the processor's primary DC input power below a selected value. The sensing capacitor may also be connected to the volatile memory's bus through a diode which permits the capacitor to float on the bus during a disruption (when the pair of switches is open) by discharging through the diode as the bus decays. When the decay ceases and the voltage rises, the diode is back biased and the lowest value reached during the disruption is preserved on the capacitor. This value is compared to a reference value which defines the lowest value necessary to sustain the integrity of the contents of the processor's volatile memory. The DPL circuit supplies a DPL signal to the processor if the lowest value reached is less than the reference value. Once the comparison is made, the pair of switches is then configured in such a way as to reconnect the sensing capacitor directly to the volatile memory's regulated DC bus.

A correct indication of an actual degradation of memory is essential to the efficient utilization of the signal processor since the CPU must execute an elaborate initialization routine following such a degradation. The DPL circuit of the invention monitors the regulated DC volatile memory supply voltage and generates a DPL signal only if the voltage decay is below the minimum value necessary to maintain the contents of the volatile memory intact. Thus, the second aspect of the present invention increases the efficient use of a signal processor by avoiding unnecessary CPU execution of elaborate initialization routines following power disruptions that do not affect the contents of volatile memory.

These and other objects, features and advantages of the present invention will become more apparent in light of the detailed description of a best mode embodiment thereof, as illustrated in the accompanying drawing.

BEST MODE FOR CARRYING OUT THE INVENTION

Figure 3:
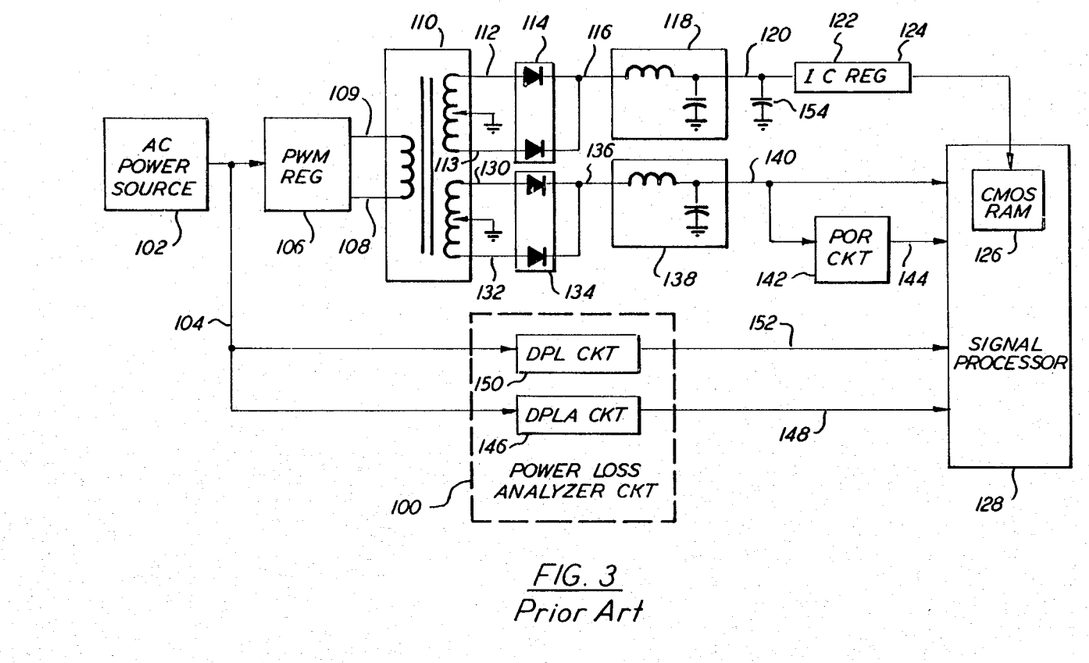
FIG. 3 is a simplified block diagram of a system that utilizes a prior art power loss analyzer circuit.

In FIG. 3, a prior art power loss analyzer circuit 100 monitors AC input voltage from an AC input power source 102 on a line 104. The voltage on the line 104 is also supplied to a PWM regulator 106 which provides a full-wave duty cycle modulated output voltage on a line 108 and on a line 109 to a transformer 110. The transformer may include a primary winding and a plurality of secondary windings for providing various amplitude versions of the input voltage on the line 108.

The transformer's first output voltage on a line 112 and on a line 113 is provided to a first rectifier 114 which converts the full-wave output voltage to a full-wave rectified output voltage on a line 116. The voltage on the line 116 is presented to a filter 118 which provides a relatively high DC voltage, e.g., 12 volts, on a line 120 to an integrated circuit (IC) regulator 122. The IC regulator provides a relatively low DC voltage, e.g., 5.2 volts, on a line 124 to a volatile memory 126, e.g., CMOS RAM, within a signal processor 128.

The transformer's second output voltage on a line 130 and on a line 132 is provided to a second rectifier 134 which converts the full-wave output voltage to a full-wave rectified output voltage on a line 136. The voltage on the line 136 is presented to a filter 138 which provides a voltage on a line 140 to the signal processor 128. The voltage on the line 140, which may be the primary DC power source for the processor, may also be provided to a power-on-reset (POR) circuit 142, which provides a POR signal on a line 144 to the signal processor 128.

The power loss analyzer circuit 100 includes a discrete power loss alert (DPLA) circuit 146 that provides a DPLA signal on a line 148 to the processor 128. In addition, the power loss analyzer circuit 100 includes a discrete power loss (DPL) circuit 150 that provides a DPL signal on a line 152 to the signal processor 128. Both the DPLA and DPL circuits monitor the AC source 102, on a conditioned signal representative thereof, for a decay below a selected value. The DPLA circuit 146 provides an alert signal on the line 148 to the processor slightly in advance of the POR signal on the line 144 and prevents the initiation of certain routines that would be adversely affected if interrupted by a POR signal. Subsequent to a long-term interruption, the DPL circuit 150 provides a DPL signal on a line 152 to the signal processor 128 indicative of an interruption having a duration longer than the estimated period the volatile memory supply voltage on the line 124 may be sustained by a storage capacitor 154. The estimated period is calculated using worst case assumptions concerning line, load, temperature, etc.

Both the DPLA circuit and the DPL circuit of the prior art power loss analyzer circuitry utilize resistor-capacitor (RC) timing networks which provide their respective signals to the signal processor at selected intervals after the delay of the AC input voltage below a selected value.

Figure 2:
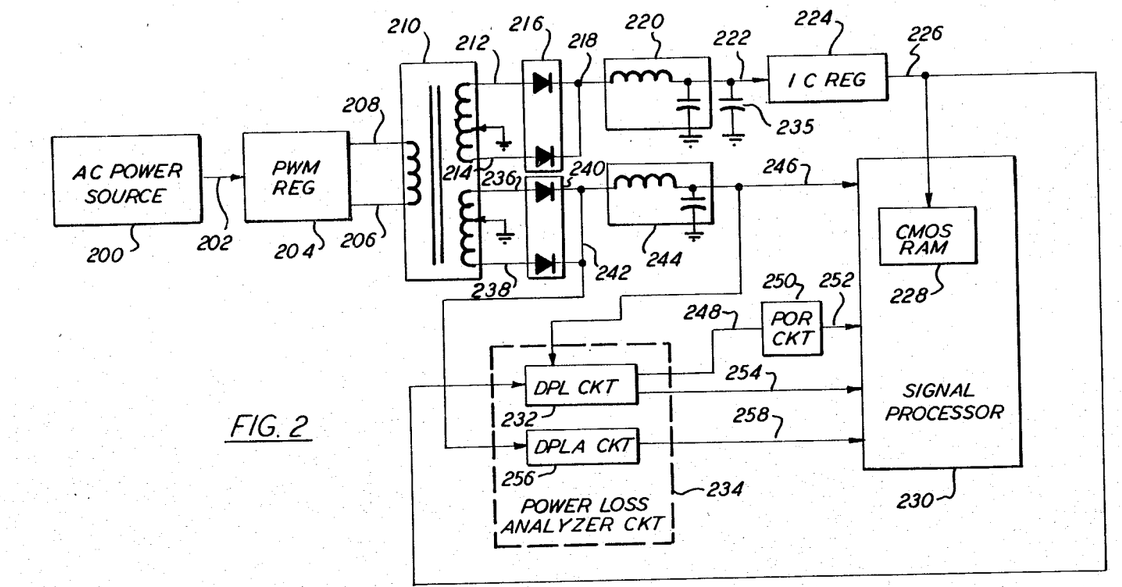
FIG. 2 is an overall block diagram of a system that includes the present invention.

FIG. 2 is an overall block diagram of a system that includes the power loss analyzer of the present invention. An AC power source 200 provides an AC voltage on a line 202 to a pulse width modulated (PWM) regulator 204. The PWM regulator provides a full-wave duty cycle modulated output voltage on a line 206 and on a line 208 to a transformer 210. It should be understood that the PWM regulator shown is of the push-pull (full-wave) type but that a flyback converter (half-wave) type might also be used.

The transformer's first output voltage on a line 212 and on a line 214 is provided to a first rectifier 216 which converts the full-wave output voltage to a full-wave rectified output voltage on a line 218. The rectified voltage on the line 218 is presented to a filter 220 which provides a relatively smooth and high value DC voltage, e.g., 12 volts, on a line 222 to an integrated circuit (IC) regulator 224. The IC regulator provides a relatively low DC voltage, e.g., 5.2 volts, on a line 226 to a volatile memory 228, e.g. CMOS RAM, within a signal processor 230, and also to a discrete power loss (DPL) circuit 232 within a power loss analyzer circuit 234. A hold-up capacitor 235 provides sufficient energy storage capability to sustain the IC regulator 224 during a power interruption for as long as 200 milliseconds under worst case conditions in the best mode embodiment.

The transformer's second output voltage on a line 236 and on a line 238 is provided to a second rectifier 240 which converts the full-wave output voltage on the lines 236, 238 to a full-wave rectified output voltage on a line 242. The rectified voltage on the line 242 is presented to a filter 244 which provides a relatively smooth and low value DC voltage, e.g. 5 VDC, on a line 246 to the signal processor 230. The voltage on the line 246, which may be the primary DC power source for the processor, is also provided to the DPL circuit 232, which provides a primary source failure signal on a line 248 to a power-on-reset (POR) circuit 250. The POR circuit provides a POR signal on a line 252 to the signal processor 230. The DPL circuit also provides a DPL signal on a line 254 to the signal processor 230.

The rectified voltage on the line 242 is also presented to a discrete power loss alert (DPLA) circuit 256 that provides a DPLA signal on a line 258 to the signal processor 230.

The DPLA circuit 256 monitors the duty cycle of the conditioned duty cycle modulated signal on the line 242 and provides a DPLA signal on the line 258 if the duty cycle exceeds a selected value. The DPLA signal on the line 258 is timed to occur slightly before the POR signal on the line 252 in order to prevent the initiation of certain routines which, if interrupted by a POR signal, would result in adverse effects in certain memory locations.

The DPL circuit 232 monitors the processor's primary DC voltage source on the line 246 and provides a failure signal on the line 248 if the voltage on the line 246 decays below a selected value, e.g. 4.75 volts. The DPL circuit also monitors the volatile memory supply voltage on the line 226 during an interruption. The DPL circuit stores the lowest voltage value reached by the volatile memory supply during the interruption and provides a DPL signal on the line 254 subsequent to an interruption only if the stored lowest voltage value reached is lower than the value necessary to sustain the contents of the volatile memory without loss of data.

It should be understood that the power loss analyzer circuit shown in FIG. 2 may easily be utilized in other similar system configurations. For example, the transformer 210 may have numerous secondary windings having a wide variety of output voltages utilized for an equally wide variety of purposes. It is not necessary that the DPLA circuit monitor the secondary windings associated with the primary DC supply for the processor in particular. It may as easily be associated with another secondary, or even the primary if the DPLA circuit contains a transformer and a rectifier, or if a flyback converter type PWM regulator is used. Similarly, the DPL circuit need not monitor only the output of an IC regulator supplying a volatile memory. The volatile memory may be supplied directly by another type regulator, or the monitored bus may serve a quite different function other than supplying power to a volatile memory; the integrity of the monitored function need only be necessarily maintained during a power interruption. It is also unnecessary to restrict the DPL circuit to monitoring of the primary DC supply for the processor. It could monitor another DC bus as well. These examples should not be regarded as all-inclusive as it should be understood that the power loss analyzer circuit as described herein may be utilized in a wide range of applications not necessarily shown here without departing from the spirit and scope of the invention.

Figure 1:
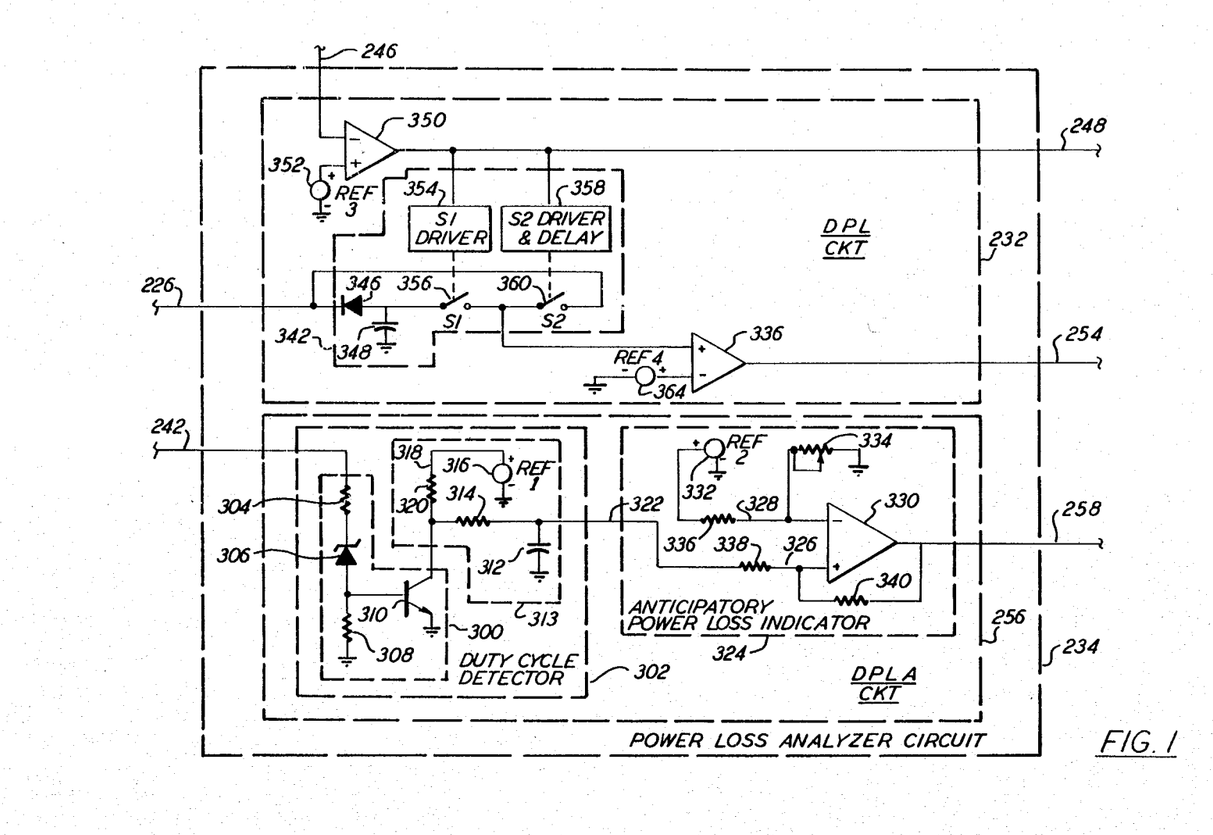
FIG. 1 is a simplified schematic diagram of the power loss analyzer circuit of the present invention.

FIG. 1 is a simplified schematic diagram of the power loss analyzer circuit of the present invention. The full-wave rectified output voltage on the line 242 is presented to a threshold network 300 which is part of a duty cycle detector 302. The threshold network 300 contains a resistor 304, a zener diode 306, and a resistor 308, which together cause a transistor switch 310 to conduct when the duty cycle modulated unipolar signal on the line 242 is "on". Similarly, the transistor switch is caused to be in its nonconducting mode when the duty cycle modulated unipolar waveform on the line 242 is "off". The zener diode 306 is placed in the voltage divider network consisting of resistors 304, 308 in order to take advantage of its sharp characteristic "knee" voltage as is well known in the art. The use of a zener is not absolutely necessary but in the best mode embodiment provides more accurate switching.

The transistor switch 310 is utilized to provide a discharge path for a capacitor 312 which is part of an integrator network 313, which discharges through a resistor 314 and the collector-emitter junction of the transistor switch 310 whenever the transistor is conducting. The state of charge that is maintained in the capacitor 312 by a first DC reference voltage (REF 1) 316 on the line 318 through a resistor 320 and the resistor 314, thus depends on the duty cycle modulated threshold circuit 300. An increasing duty cycle of the waveform on the line 242 will cause the switch 310 to remain on for an increasing period of time during each cycle and will thereby cause the charge on the capacitor 312 to be depleted with a corresponding decrease of its voltage.

The signal voltage of the capacitor on the line 322 is presented to an anticipatory power loss indicator 324 which provides a DPLA signal on the line 258 if the voltage on the line 326 falls below a reference voltage on a line 328. The anticipatory power loss indicator 324 and the duty cycle detector 302 together make up the DPLA circuit 256.

The anticipatory power loss indicator includes a comparator 330, a second DC reference voltage source (REF 2) 332, a potentiometer 334 for changing the reference value, a resistor 336, a resistor 338, and a resistor 340.

The DPLA circuit is designed to provide a DPLA signal to the signal processor prior to the reception of a POR signal. Since the POR signal is utilized by the signal processor to interrupt all processing, and since there are selected operations that should not be interrupted by a POR signal, the DPLA signal is provided to the processor sufficiently in advance of a POR signal so that any of these selected operations initiated before the reception of a DPLA signal may be completely executed before a POR interrupt signal is received by the processor.

The volatile memory supply voltage on the line 226 is provided to a sensor circuit 342 within the DPL circuit 232.

The processor's primary source voltage on the line 246 is presented to a comparator 350 where it is compared to a third DC reference voltage (REF 3) 352. If the primary DC source voltage on the line 246 decays below a selected value, e.g. 4.75 volts, the comparator provides a failure signal on the line 248 to a driver 354 for a switch (S1) 356 and to a driver and delay 358 for a switch 360. Under normal operating conditions, i.e., prior to the presence of a failure signal on the line 248, both switches 356, 360 are closed and the voltage on a capacitor 348 is equal to the volatile memory supply voltage on the line 226. Upon the appearance of a failure signal on the line 248, the driver 354 causes the switch 356 to open and the driver and delay 358 causes the switch 360 to open. The capacitor 348 is thus disconnected from its direct connection to the volatile memory supply voltage on the line 226. The volatile memory supply voltage on the line 226 will not begin to decay as early as the processor's primary DC source voltage on the line 246 because the volatile memory supply is sustained for a brief period by passive energy storage elements (See the hold-up capacitor 235 in FIG. 2). However, if the voltage on the line 226 does begin to decay, the charge stored in the capacitor 348 will begin to discharge through a diode 346 and its voltage will decay in direct proportion to the voltage decay that occurs on the line 226. After the voltage on the line 226 stops decaying and begins to rise, the diode 346 becomes back-biased and the lowest value reached by the volatile memory supply voltage on the line 226 is preserved (taking into account the voltage drop across the diode 346) since the switches 356, 360 remain opened during such a voltage rise.

After the primary DC source voltage on the line 246 is restored to a selected value, e.g. 4.75 volts, the comparator removes the failure signal on the line 248 and the driver 354 causes switch (S1) 356 to close. The driver and delay 358 causes switch (S2) 360 to remain opened for a selected interval so that a comparator 366 can compare the voltage preserved on the capacitor 348 to a fourth DC reference voltage (REF 4) 364. If the voltage preserved on the capacitor is less than the reference voltage, the comparator 366 provides a DPL signal on the line 254 which indicates that the volatile memory supply decayed during the interruption below the minimum value necessary to maintain the integrity of the data contained in the volatile memory. After the selected interval, the driver and delay 358 causes the switch (S2) 360 to close and the capacitor 348 is again directly connected to the volatile memory supply voltage on the line 246.

Figure 4:
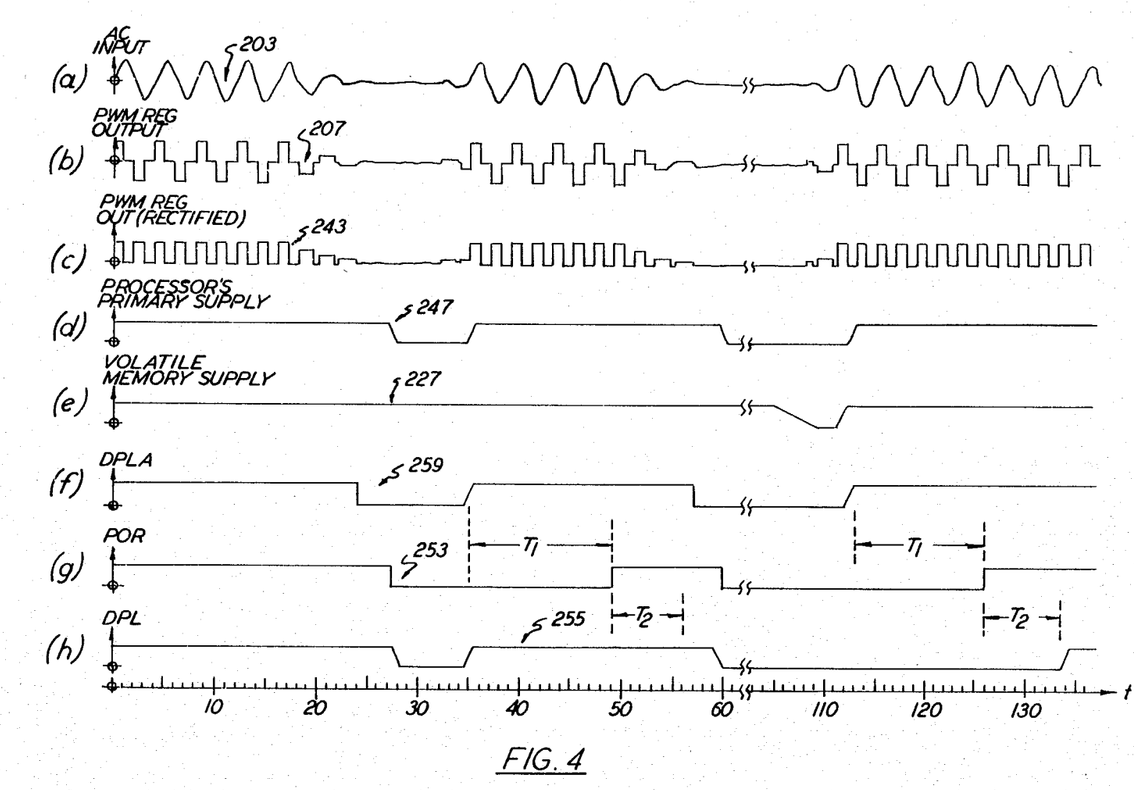
FIG. 4 is a diagram showing some typical waveforms associated with the power loss analyzer circuit of the present invention.

In FIG. 4 is shown a number of waveforms having a common timebase (each interval corresponds to approximately 4.167 milliseconds if a 60 cycle AC source voltage is assumed; of course, it should be understood that any frequency could have been selected) which illustrate some of the voltages associated with the apparatus of FIGS. 1 and 2 (all references to voltages or signals refer to FIG. 1 unless otherwise indicated).

Illustration (a) of FIG. 4 shows the waveform 203 associated with the AC power source voltage on the line 202 of FIG. 2 and a relatively short term interruption thereof from times t=18 until t=35 (the total duration of this interruption is about 71 milliseconds, assuming a 60 cycle source). A relatively long-term interruption from times t=51 until t=111 is also shown (the total duration of this interruption is about 250 milliseconds, which is longer than the volatile memory can be sustained by the hold-up capacitor 235 of FIG. 2 under worst case conditions).

Illustration (b) of FIG. 4 shows the output waveform 207 of the PWM regulator which appears across the primary of the transformer 210 of FIG. 2 between the line 206 and the line 208. The waveform is full wave and may be seen to steadily increase its duty cycle beginning at t=19 until t=25 when its amplitude approaches zero. The same increase in duty cycle with decreasing amplitude can be seen from t=51 to t=57.

Illustration (c) of FIG. 4 shows the rectified output waveform 243 of the PWM regulator which appears on the line 242 of FIGS. 1 and 2. It is utilized in the duty cycle detector 302 of FIG. 1 to control the state of the transistor switch 310 as described supra.

Illustration (d) of FIG. 4 shows the DC voltage waveform 247 of the processor's primary supply voltage on the line 246 of FIGS. 1 and 2. After the beginning of an interruption of the AC input power at $t=18$ and at $t=51$, the primary supply is "held up" for several milliseconds (or even for as long as several cycles as illustrated) by energy storage elements such as capacitors. The decay that begins at $t=27$ and at $t=60$ is monitored by the comparator 350 of FIG. 1 for decay below a selected value, e.g. 4.75 volts if the normal supply is 5 volts, which triggers the failure signal on the line 248 of FIGS. 1 and 2.

Illustration (e) of FIG. 4 shows the DC voltage waveform 227 corresponding to the volatile memory supply voltage on the line 226 of FIGS. 1 and 2. During the interruption from $t=18$ to $t=35$, the volatile memory supply voltage waveform is unaffected. This is due to the capacitor 235 of FIG. 2, which stores sufficient energy to maintain the supply voltage for a minimum of, e.g. 200 milliseconds under worst case conditions. During the interruption from $t=51$ to $t=111$, the waveform 227 is shown unaffected from $t=51$ to $t=105$ (a period of about 225 milliseconds). After time $t=105$, the voltage begins to decline until it reaches zero at $t=109$. This particular interruption lasted just long enough to cause the complete depletion of the energy stored in the capacitor 235 of FIG. 2. The resulting decline of the volatile memory supply voltage, in this case approximately 225 milliseconds after the interruption began, harms the integrity of the data stored in the volatile memory below a minimum voltage value. The minimum voltage value depends on the memory manufacturer's specifications.

Illustration (f) of FIG. 4 shows the DPLA signal waveform 259 occuring at $t=26$ and again at $t=58$. The DPLA signal is triggered by the duty cycle of waveform 243 of Illustration (c) exceeding the selected duty cycle value. The DPLA signal on the line 258 of FIGS. 1 and 2 is timed to precede the POR signal on the line 252 of FIG. 2 by an interval long enough to permit the execution of certain selected routines before they can be interrupted by a POR signal.

Illustration (g) of FIG. 4 shows the POR signal waveform 253 occurring at $t=27+$ and again at $t=60-$. The POR signal is triggered by a decay of the processor's primary supply voltage below the selected value. In illustration (d) the supply voltage begins its decline at $t=27$ and again at about $t=59.5$. The POR signal is shown occurring slightly after the onset of the decay, corresponding to a decay below the selected value, e.g., 4.75 volts. The POR signal stays low for a selected warm-up period (T1) after AC power is restored during a power-on sequence.

Illustration (h) of FIG. 4 shows the DPL signal waveform 255 corresponding to the DPL signal on the line 254 of FIGS. 1 and 2. The signal processor checks the status of the DPL signal during a selected interval (T2) subsequent to the POR signal going high after the selected warm-up period. If the DPL is low after the selected interval, the signal processor concludes that the contents of volatile memory are not reliable and acts accordingly. For example, the DPL waveform is shown in a low state from $t=28$ to $t=35$. If the selected warm-up period (T1), illustrated between Illustrations (f) and (g), has been selected to be about 58 milliseconds, the DPL signal waveform 255 is shown already high before the POR goes high at $t=49$. Therefore, the signal processor will conclude, during the selected interval (T2), that the contents of the volatile memory are intact. As a second example, the DPL waveform 255 is shown in a low state from $t=60$ to $t=134$. The DPL waveform 255 is still low after the POR waveform 253 goes high after the warm-up period (T1). Therefore, the signal processer will conclude during the selected interval (T2), that the contents of the volatile memory are not reliable.

It should be understood by those skilled in the art, that the power loss analyzer circuit of the present invention may be implemented by various other techniques including digital methods and combinations thereof with the analog implementation shown herein. Likewise, the DPLA and DPL circuits of the present invention may be interfaced with other types of power supplies and duty cycle modulated regulators without departing from the scope and spirit of the invention.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. Apparatus for providing, to an associated electronic signal processor of the type energized by a pulse width modulated (PWM) regulator with specified maximum duty cycle, a discrete power loss alert (DPLA) signal indicative of a disruption of the AC input power source to the PWM regulator, and for providing, in response to such power disruptions which reduce the processor's memory power supply output voltage to less than a minimum value, a discrete power loss (DPL) signal indicative of degradation of the memory's stored data resulting from such power disruption comprising:

DPLA circuit means, responsive to the PWM regulator output signal waveform for providing the DPLA signal in response to an actual duty cycle value greater than the specified maximum duty cycle; and DPL circuit means, responsive to the lowest voltage value of the memory power supply occurring in the presence of a power disruption for comparing said lowest voltage value to a selected voltage value and for providing the DPL signal in response to said minimum voltage value being less than said selected value.

2. The apparatus of claim 1, wherein said DPLA circuit means includes:

duty cycle detector means responsive to the PWM regulator output signal waveform for providing a signal manifestation representative of the actual duty cycle value of the PWM output waveform;

duty cycle reference signal source means for providing a duty cycle reference signal value representative of the PWM regulator's specified maximum duty cycle; and comparator means responsive to said duty cycle detector means and said duty cycle reference signal source means for comparing the value of said signal manifestation to said duty cycle reference signal value and for providing the DPLA signal in response to said actual duty cycle value greater than the value of the specified maximum duty cycle.

3. The apparatus of claim 2, wherein said duty cycle detector means, comprises:
   gated integrator means, responsive to a DC source voltage, and responsive also to modulation signals presented to a gate input thereof, for providing said signal manifestation as the time integral of said DC source voltage as modified by said modulation signals according to changes in the duty cycle of the PWM output signal waveform; and
   threshold signal detection means, responsive to the PWM regulator output signal waveform for providing, above a selected signal threshold value, said modulation signals to said gate input of said gated integrator means, the duration of said modulation signals changing according to changes in the duty cycle of the PWM regulator output signal waveform.

4. The apparatus of claim 1, wherein said DPL circuit means includes:
   sensor means, for sensing the present value of the processor's memory power supply output voltage and for storing the lowest voltage value thereof occurring in the presence of a power disruption and for storing said lowest voltage value for a selected interval thereafter;
   first reference signal means for providing a first reference signal representative of a selected minimum output voltage value of the memory power supply below which a power disruption is assumed;
   first comparator means responsive to first reference signal and to the present value of said memory power supply's output voltage, for comparing each to provide a power disruption signal in response to said present value being less than said first reference signal value;
   second reference signal source means, for providing a second reference signal representative of the minimum memory power supply output voltage required to prevent degradation of data stored in memory;
   second comparator means, responsive at a first input to said lowest voltage value and responsive at a second input to said second reference signal, for providing a DPL signal to the signal processor in response to said lowest voltage value being less than said second reference signal value.

5. The apparatus of claim 4, wherein said sensor means includes:
   series connected capacitor and diode means, electrically connected across the output of the processor's memory power supply, said diode electrically connected at its cathode to the positive side of the memory power supply output and at its anode to said capacitor, said capacitor being electrically connected at its other end to the negative side of the memory power supply output, said diode being forward biased to provide said capacitor a discharge path in the presence of a power disruption and being back biased at all other times;
   first gated switch means, electrically connected at a first nose to the electrical connection between said cathode of said diode and said capacitor, responsive to said power disruption signal, for opening during the power disruption and for closing at all other times;
   second gated switch means, electrically connected at a first node to a second node of said first gated switch means and at a second node to the processor's memory power supply, responsive to said power disruption signal, for opening during a power disruption and for said selected interval thereafter and for closing at all other times.

6. Apparatus for providing, to an associated electronic signal processor of the type energized by a pulse width modulated (PWM) regulator with specified maximum duty cycle, a discrete power loss alert (DPLA) signal indicative of a disruption of the input voltage to the PWM regulator, comprising:
   duty cycle detector means responsive to the PWM regulator output signal waveform for providing a modified duty cycle signal representative of the actual duty cycle value of the PWM output waveform;
   duty cycle reference signal source means for providing a duty cycle reference signal value representative of the PWM regulator's specified maximum duty cycle; and
   comparator means responsive to said duty cycle detector means and said duty cycle reference signal source means for comparing the value of said modified duty cycle signal to said duty cycle reference signal value and for providing the DPLA signal in response to said actual duty cycle value greater than the value of the specified maximum duty cycle.

7. The apparatus of claim 6, wherein said duty cycle detector means, comprises:
   gated integrator means, responsive to a DC source voltage, and responsive also to modulation signals presented to a gate input thereof, for providing said signal manifestation as the time integral of said DC source voltage as modified by said modulation signals according to changes in the duty cycle of the PWM output signal waveform; and
   threshold signal detection means, responsive to the PWM regulator output signal waveform for providing, above a selected signal threshold value, said modulation signals to said gate input of said gated integrator means, the duration of said modulation signals changing according to changes in the duty cycle of the PWM regulator output signal waveform.

8. Apparatus for providing, to an associated electronic signal processor having a volatile memory with a regulated power supply, a discrete power loss (DPL) signal indicative of a disruption of the AC power source, for identifying to the processor after a disruption of any resulting degradation of the data stored within the processor's volatile memory, comprising:
   sensor means, for sensing the present value of the regulated power supply output voltage and for storing the lowest voltage value thereof in the presence of a power disruption and for storing said lowest voltage value for a selected interval thereafter;
   first reference signal source means, for providing a first reference signal representative of a selected minimum output voltage value of the memory power supply below which a power disruption is assumed;
   first comparator means, responsive to said first reference signal value and to the present value of said memory power supply's output voltage, for comparing each to provide a power disruption in response to said present value being less than said first reference signal value;

second reference signal source means, for providing a second reference signal representative of the minimum memory power supply output voltage required to prevent degradation of data stored in memory;

second comparator means, reponsive at a first input to said lowest voltage value and responsive at a second input to said second reference signal, for providing a DPL signal to the signal processor in response to said lowest voltage value being less than said second reference signal value.

9. The apparatus of claim 8, wherein said sensor means includes:

series connected capacitor and diode means, electrically connected across the output of the processor's memory power supply, said diode electrically connected at its cathode to the positive side of the memory power supply output and at its anode to said capacitor, said capacitor being electrically connected at its other end to the negative side of the memory power supply output, said diode being forward biased to provide said capacitor a discharge path in the presence of a power disruption and being back biased at all other times;

first gated switch means, electrically connected at a first node to the electrical connection between said cathode of said diode and said capacitor, responsive to said power disruption signal, for opening during the power disruption and for closing at all other times;

second gated switch means, electrically connected at a first node to a second node of said first gated switch means and at a second node to the processor's memory power supply, responsive to said power disruption signal, for opening during a power disruption and for said selected interval thereafter and for closing at all other times.

* * * * *